United States Patent
Kumai et al.

(12) 
(10) Patent No.: US 6,515,102 B2
(45) Date of Patent: Feb. 4, 2003

(54) PROCESS FOR RECOVERING FLUOROPOLYMERS

(75) Inventors: Seisaku Kumai, Kanagawa (JP); Yutaka Fukatsu, Kanagawa (JP); Harumi Mihara, Kanagawa (JP); Ryota Tokura, Kanagawa (JP)

(73) Assignees: Asahi Glass Company, Limited, Tokyo (JP); Seimi Chemical Co., Ltd., Chigasaki (JP)

( * ) Notice: Subject to any disclaimer, the term of this patent is extended or adjusted under 35 U.S.C. 154(b) by 0 days.

(21) Appl. No.: 10/092,630

(22) Filed: Mar. 8, 2002

(65) Prior Publication Data

US 2002/0128430 A1 Sep. 12, 2002

(30) Foreign Application Priority Data

Mar. 9, 2001 (JP) ........................................ 2001-067300

(51) Int. Cl.$^7$ .................................................. C08F 6/00
(52) U.S. Cl. ...................................................... 528/480
(58) Field of Search ......................................... 528/480

(56) References Cited

U.S. PATENT DOCUMENTS 4,585,801 A    4/1986   Burney, Jr. et al.
6,300,526 B1 * 10/2001  Navarrini et al. ........... 525/276

FOREIGN PATENT DOCUMENTS

| EP | 0 066 369 | 12/1982 |
|----|-----------|---------|
| JP | 03-14860  | 2/1991  |
| JP | 11-288732 | 10/1999 |
| JP | 2000-86809 | 3/2000 |

OTHER PUBLICATIONS

Patent Abstracts of Japan, JP 61–097336, May 15, 1986.

* cited by examiner

*Primary Examiner*—Terressa M. Boykin
(74) *Attorney, Agent, or Firm*—Oblon, Spivak, McClelland, Maier & Neustadt, P.C.

(57) ABSTRACT

A process for recovering fluoropolymers, which comprises contacting an ion exchange membrane comprising a fluoropolymer having carboxylic acid groups (hereinafter referred to as a C-polymer) and a fluoropolymer having sulfonic acid groups (hereinafter referred to as a S-polymer) and having inorganic particles deposited on the surface, with a solvent which is a good solvent for the C-polymer and a good solvent for the S-polymer, to separate a solution having the C-polymer and the S-polymer dissolved therein, and the inorganic particles, then esterifying the C-polymer in the solution to form precipitate of an ester of the C-polymer, and fractionating and recovering the precipitate and a solution having the S-polymer dissolved therein by solid-liquid separation.

19 Claims, No Drawings

PROCESS FOR RECOVERING FLUOROPOLYMERS

The present invention relates to a process for recovering fluoropolymers from fluorine-containing ion exchange membranes used for e.g. electrolysis of sodium chloride.

Fluorine-containing ion exchange membranes are widely used as diaphragms for electrolytic cells for the production of sodium hydroxide by electrolysis of sodium chloride. As such a fluorine-containing ion exchange membrane, a laminated ion exchange membrane having from 2 to 4 laminated films of a fluoropolymer having carboxylic acid groups and a fluoropolymer having sulfonic acid groups, or one having such a laminated ion exchange membrane reinforced by a woven fabric made of polytetrafluoroethylene (hereinafter referred to as PTFE).

Further, for the purpose of preventing deposition, on the membrane surface, of a gas generated during electrolysis and reducing the voltage for electrolysis, one having inorganic particles of e.g. silicon carbide or zirconium oxide coated on the surface of a laminated ion exchange membrane, is used. On the other hand, on the surface of the ion exchange membrane, precipitates composed mainly of iron oxide or a hydrate thereof (hereinafter referred to as surface precipitates) are likely to deposit during the electrolysis.

Heretofore, when the performance of ion exchange membranes used for the electrolysis decreased, it was common that they were dismounted from the electrolytic cell and used or disposed for e.g. land filling as wastes. However, in recent years, it is desired to recover and reuse fluoropolymers constituting the ion exchange membranes as materials for ion exchange membranes or membranes for fuel cells, from the viewpoint of avoiding the influence over the environment.

In order to recover and reuse a fluoropolymer having carboxylic acid groups and a fluoropolymer having sulfonic acid groups from ion exchange membranes, it is necessary not only to separate the two but also to remove the above-mentioned woven fabric and inorganic particles from the ion exchange membranes.

The following methods have therefore been known as a method for recovering fluoropolymers from fluorine-containing ion exchange membranes. A method wherein laminated fluorine-containing ion exchange membranes comprising two or more fluoropolymer layers having e.g. carboxylic acid groups and/or sulfonic acid groups, are converted to acid-forms or alkali metal salt-forms and then immersed in a water-soluble organic solvent to elute the respective fluoropolymers, and the respective fluoropolymers are recovered from the eluted solution (JP-B-3-14860), or a method wherein laminated ion exchange membranes comprising a fluoropolymer having carboxylic acid groups and a fluoropolymer having sulfonic acid groups, are immersed in a fluoroalcohol to elute the fluoropolymer having sulfonic acid groups (JP-A-2000-86809).

However, in these methods, it is difficult to remove inorganic particles, whereby there will be a problem that the obtainable fluoropolymers are of low purity.

It is an object of the present invention to provide a process for efficiently recovering a fluoropolymer having carboxylic acid groups and a fluoropolymer having sulfonic acid groups, respectively, in high purity, by removing inorganic particles from an ion exchange membrane comprising the fluoropolymer having carboxylic, acid groups, the fluoropolymer having sulfonic acid groups and the inorganic particles deposited on the surface.

The present invention provides a process for recovering fluoropolymers, which comprises contacting an ion exchange membrane comprising a fluoropolymer having carboxylic acid groups (hereinafter referred to as a C-polymer) and a fluoropolymer having sulfonic acid groups (hereinafter referred to as a S-polymer) and having inorganic particles deposited on the surface, with a solvent which is a good solvent for the C-polymer and a good solvent for the S-polymer, to separate a solution having the C-polymer and the S-polymer dissolved therein, and the inorganic particles, then esterifying the C-polymer in the solution to form precipitate of an ester of the C-polymer, and fractionating and recovering the precipitate and a solution having the S-polymer dissolved therein by solid-liquid separation.

Here, the inorganic particles include not only particles of e.g. silicon carbide or zirconium oxide deposited on the surface of the ion exchange membrane to prevent attachment of gas, but also surface precipitates, etc. deposited during the electrolysis. Further, in this specification, the C-polymer includes not only one in the form of an acid-form but also one wherein a part or whole of the fluoropolymer having carboxylic acid groups is in the form of a salt-form. Likewise, the S-polymer includes not only one in the form of an acid-form but also one in which a part or whole of the fluoropolymer having sulfonic acid groups is in the form of a salt-form.

According to the present invention, inorganic particles on the surface of an ion exchange membrane are preliminarily removed, and then the C-polymer and the S-polymer are recovered, whereby the C-polymer and the S-polymer can be obtained in high purity. Further, the C-polymer in the solution having the C-polymer and the S-polymer dissolved therein, is esterified to form precipitate of an ester of the C-polymer, whereby the C-polymer and the S-polymer can easily be separated and recovered by solid-liquid separation.

Further, in a second aspect, the present invention provides a process for recovering fluoropolymers, which comprises treating an ion exchange membrane comprising a C-polymer and a S-polymer and having inorganic particles deposited on the surface, with a solvent to let it swell and to remove the inorganic particles, then contacting it with a solvent which is a good solvent for the C-polymer and a good solvent for the S-polymer to obtain a solution having the C-polymer and the S-polymer dissolved therein, esterifying the C-polymer in the solution to form precipitate of an ester of the C-polymer, and fractionating and recovering the precipitate and a solution having the S-polymer dissolved therein by solid-liquid separation.

According to this process, the ion exchange membrane is swelled by a solvent, whereby inorganic particles can easily be separated from the ion exchange membrane, and the C-polymer and the S-polymer can be obtained in high purity.

Further, in this specification, the solvent which is a good solvent for the C-polymer and a good solvent for the S-polymer, will be hereinafter referred to simply as a good solvent. Further, the solvent to let the ion exchange membrane swell thereby to remove inorganic particles, will be hereinafter referred to as a swelling solvent.

The following compounds may be mentioned as preferred good solvents in the present invention. An alkyl alcohol such as methanol, ethanol, n-propanol or i-propanol, a solution which is a mixed solution comprising the above alkyl alcohol and water, wherein the content of water is at most 30 mass%, an amide such as N,N-dimethylformamide, N,N-dimethylacetoamide or N-methylpyrrolidone, a ketone such as acetone or 2-butanone, an ether such as diethyl ether, dipropyl ether, diisopropyl ether, dibutyl ether, 1,2- dimethoxyethane, tetrahydrofuran or 1,4-dioxane, a nitrile compound such as acetonitrile, a sulfur-containing compound such as dimethylsulfoxide or sulfolane, and a fluorocompound such as 1,1-dichloro-2,2,3,3,3-pentafluoropropane, 1,3-dichloro-1,1,2,2,3-pentafluoropropane, 1,1-dichloro-2,2,2-trifluoroethane, 1,1,1,2,3,3-hexafluoropropane, 1,1,1,2,3,4,4,5,5,5-decafluoropentane, perfluoro(n-butylmethyl)ether, 1,1,1,3,3,3-hexafluoro-2-propanol, 2,2,3,3,3-pentafluoro-1-propanol, 2,2,2-trifluoroethanol or 2,2,3,3-tetrafluoropropanol.

Especially, when the good solvent is an alkyl alcohol such as methanol, ethanol, n-propanol or i-propanol, or a mixed solution comprising such an alkyl alcohol and water, such a good solvent can be used as it is for the esterification reaction of the C-polymer, such being preferred. Particularly preferred is methanol or an aqueous methanol solution wherein the content of water is at most 30 mass%.

Further, in the ion exchange membrane after being used for electrolysis of sodium chloride, the fluoropolymers are mostly in the form of a sodium salt whether they have carboxylic acid groups or sulfonic acid groups. Accordingly, with a view to increasing the solubility in the good solvent, it is preferred to treat the C-polymer and the S-polymer with an acid to convert them from the salt-forms to the acid-forms before or at the time of contacting the ion exchange membrane with the good solvent.

As the acid to be used for this purpose, hydrochloric acid, sulfuric acid, phosphoric acid, nitric acid or acetic acid is, for example, preferred. Particularly preferred is hydrochloric acid. Further, in order to neutralize most of the salt, it is preferred that the amount of the acid is at least 1 equivalent to the total of the salt type ion exchange groups in the C-polymer and the salt type ion exchange groups in the S-polymer. On the other hand, the amount of the acid is preferably at most 10 equivalents, to the total of the above salt type ion exchange groups.

Further, the preferred concentration of the acid to be used, is from 0.5 to 20 mass%, although it may vary depending upon the type of the acid. This treatment of the ion exchange membrane with the acid is preferably carried out at the time of separating the inorganic particles.

The temperature at the time of contacting the ion exchange membrane with the good solvent, varies depending upon the solvent, the type of the acid to be added and their mixing ratio, but it is usually preferably from 0 to 100° C., particularly preferably from 15 to 50° C. At that time, the pressure may be normal pressure, but with a view to increasing the solubility, dissolution may be carried out under elevated pressure.

Further, in the second process of the present invention, the ion exchange membrane is swelled by the swelling solvent to separate and remove the inorganic particles, before contacting the ion exchange membrane with the good solvent. The following methods may be mentioned as preferred methods for separating the inorganic particles.

1) The ion exchange membrane is fixed. Then, the swelling solvent is continuously supplied and contacted with the ion exchange membrane by a method such as refluxing under heating or circulation by pumping. As the ion exchange membrane swells, the inorganic particles will be separated from the ion exchange membrane and dispersed in the swelling solvent. For the purpose of accelerating the separation of the inorganic particles, the ion exchange membrane may be shaked when the solvent is contacted with the ion exchange membrane.

2) The ion exchange membrane is cut into a proper size, preferably from 1 to 30 square cm, and put into the swelling solvent, followed by stirring. The stirring time is preferably at least 5 hours, particularly preferably at least 20 hours. At that time, it is preferred to heat the solvent for the purpose of accelerating the swelling. Then, the inorganic particles will be removed by a method wherein sieving is carried out so that the ion exchange membrane will remain on the sieve and thus will be separated from the solvent having the inorganic particles dispersed therein, or a method wherein the inorganic particles in the solvent will be precipitated and removed from a mixture comprising the ion exchange membrane and the solvent having the inorganic particles dispersed therein, and then the ion exchange membrane will be withdrawn.

The swelling ratio when the ion exchange membrane is permitted to swell is preferably at least 1.2, particularly preferably from 1.3 to 3.0. Here, the swelling ratio is the ratio of the mass of the ion exchange membrane after swelling to the mass of the ion exchange membrane before swelling. When the swelling ratio is at least 1.2, the inorganic particles can sufficiently be separated. Further, when the swelling ratio is at most 3.0, handling of the ion exchange membrane is easy, such being preferred.

The swelling solvent to let the ion exchange membrane swell, is preferably a mixed solvent comprising a water-soluble organic solvent and water, whereby the solubility of the fluoropolymers is low. As a preferred water-soluble organic solvent, methanol, ethanol, n-propanol, i-propanol, dioxane, acetone, sulfolane, an ethylene glycol or a propylene glycol may be mentioned. Among them, from the viewpoint of efficiency in recovery and reuse of the solvent, methanol, ethanol, isopropyl alcohol or acetone is particularly preferred, and especially from the viewpoint of the handling efficiency, methanol or ethanol is preferred.

The content of water in the mixed solvent comprising a water-soluble organic solvent and water, varies depending upon the type of the water-soluble organic solvent, the type and amount of the acid to be added and the temperature, but is preferably at least 50 mass%, particularly preferably from 80 to 95 mass%. Further, an especially preferred mixed solvent of an organic solvent and water, is an aqueous ethanol solution, wherein the content of water is from 60 to 98 mass%.

Further, the temperature to let the ion exchange membrane swell, varies depending upon the solvent, the type of the acid to be added and their blend ratio, but it is preferably from 0 to 100° C., particularly preferably from 15 to 50° C. If the temperature is too high, the amounts of the C-polymer and the S-polymer dissolved in the solvent increase, whereby the recovery rates of the C-polymer and the S-polymer will decrease. The pressure to let the ion exchange membrane swell, may be normal pressure or elevated pressure.

Further, the method for esterifying only the C-polymer in the solution having the C-polymer and the S-polymer dissolved therein, is preferably a method wherein the above solution is heated and reacted together with an alcohol. In such a reaction, it is preferred to carry out the reaction by adding e.g. an acid such as hydrochloric acid, sulfuric acid or phosphoric acid, or thionyl chloride. In the above method, the alcohol is preferably an alkyl alcohol such as methanol, ethanol, n-propanol or i-propanol. It is preferred that the good solvent for the C- and S-polymers is such an alkyl alcohol, since the good solvent may be used as it is, for the esterification reaction of the C-polymer.

The obtained ester of the C-polymer may be used in the form of the ester depending upon the application for reuse, or it may be further hydrolyzed and used as a carboxylic acid.

The process for recovering the fluoropolymers of the present invention is suitable for recovering the C-polymer and the S-polymer from an ion exchange membrane for electrolysis of sodium chloride, containing the C-polymer and the S-polymer.

The C-polymer for an ion exchange membrane for electrolysis of sodium chloride may be an ion exchange membrane made of a copolymer of tetrafluoroethylene with perfluorovinyl ether having a carboxylic acid group and having an ion exchange capacity of from 0.8 to 1.9 meq/g dry resin. The above copolymer is preferably one obtained by hydrolyzing a precursor which is a copolymer of tetrafluoroethylene with perfluorovinyl ether having a carboxylate group. Here, the perfluorovinyl ether having a carboxylate group is preferably one represented by the formula $CF_2=CF-(OCF_2CFX)_p-(O)_q-(CF_2)_r-CO_2CH_3$, wherein p=0 to 3, q is 0 or 1, provided p+q≧1, r is 0 to 12, and X is —F or —CF$_3$. Particularly preferred are the following:

$CF_2=CFOCF_2CF_2CO_2CH_3$, $CF_2=CFOCF_2CF_2CF_2CO_2CH_3$, $CF_2=CFOCF_2CF(CF_3)OCF_2CF_2CO_2CH_3$.

Further, as the precursor, a three component type copolymer is also preferred which is obtained by polymerizing the following perfluorovinyl ether together with tetrafluoroethylene and perfluorovinyl ether having a carboxylate group.

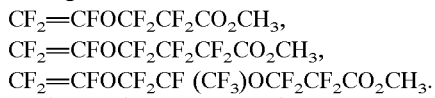

$CF_2=CFOCF_2CF_2CF_3$, $CF_2=CFOCF_2CF(CF_3)OCF_2CF_2CF_3$.

Further, the S-polymer for the above ion exchange membrane for electrolysis of sodium chloride may be an ion exchange membrane made of a copolymer of tetrafluoroethylene with perfluorovinyl ether having a sulfonic acid group, and having an ion exchange capacity of from 0.8 to 1.3 meq/g dry resin. The above copolymer is preferably one obtained by hydrolyzing a precursor which is a copolymer of tetrafluoroethylene with perfluorovinyl ether having a sulfonyl fluoride group. Here, the perfluorovinyl ether having a sulfonyl fluoride group is preferably one represented by the formula $CF_2=CF-(OCF_2CFZ)_s-(O)_t-(CF_2)_u-SO_2F$ wherein s=0 to 3, t is 0 or 1, provided s+t≧=1, u is 0 to 12, and Z is —F or —CF$_3$. Particularly preferred are the following.

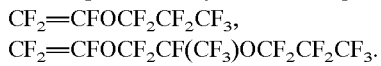

$CF_2=CFOCF_2CF_2SO_2F$, $CF_2=CFOCF_2CF(CF_3)OCF_2CF_2SO_2F$.

Further, in the present invention, in a case where the ion exchange membrane is laminated with a reinforcing material such as a woven fabric made of PTFE, it is preferred to remove the reinforcing material at the time of removing the inorganic particles, or by dissolving the ion exchange membrane in a good solvent, followed by filtration.

According to the present invention, since the C-polymer and the S-polymer can be recovered in high purity, respectively, it is possible to reuse them without purification after the recovery. However, if a higher purity is required depending upon the particular purpose, purification is carried out. As a purification method, preferred is a method wherein the recovered C-polymer or S-polymer is subjected to heat treatment in an alcohol such as methanol in the presence of sulfuric acid, and the resulting ester (solid) of the C-polymer is separated and removed.

The C-polymer or its esterified compound recovered by the present invention, can be reused as a material for an ion exchange membrane for electrolysis of sodium chloride. The S-polymer is useful as a membrane material for a fuel cell, as a material for an ion exchange membrane for electrolysis of sodium chloride or as a material for fluororesin fibers.

In the recovery process of the present invention, a specific example of permitting an ion exchange membrane to swell thereby to remove inorganic particles, will be as follows.

An ion exchange membrane having a woven fabric of PTFE laminated and inorganic particles deposited on the surface, is cut and then treated with an acid solution e.g. a mixed solution of a 10 mass% hydrochloric acid aqueous solution and ethanol (10 mass% hydrochloric acid aqueous solution/ethanol=90%/10%). Then, filtration is carried out by means of a sieve, and the obtained filtered product is washed with a washing liquid such as water to remove the inorganic particles (the filtered product is the polymer components, and the inorganic particles are dispersed in the filtrate). The filtered product is dissolved in methanol as a good solvent, whereupon a mixed solution of the C-polymer and the S-polymer is withdrawn, and the woven fabric of PTFE is removed by filtration. Then, the mixed solution of the C-polymer and the S-polymer is heated to let the methyl ester of the C-polymer precipitate, whereupon the methyl ester of the C-polymer as solid and the S-polymer as liquid are separated by solid-liquid separation.

In the process for recovering fluoropolymers of the present invention, a specific example of contacting an ion exchange membrane with a good solvent thereby to remove inorganic particles, will be as follows.

An ion exchange membrane having a woven fabric of PTFE laminated and inorganic particles deposited on the surface, is cut and treated with an acid solution e.g. a mixed solution of a 10 mass% hydrochloric acid aqueous solution and ethanol (volume ratio: 10 mass% hydrochloric acid aqueous solution/ethanol=90%/10%), to convert all of the C-polymer and the S-polymer to acid-forms. Then, they are contacted with methanol as a good solvent, whereupon a mixed solution of the C-polymer and the S-polymer is withdrawn, and at the same time, the inorganic particles and the woven fabric of PTFE are removed by filtration. The mixed solution of the C-polymer and the S-polymer, is heated to let a methyl ester of the C-polymer precipitate, and the methyl ester of the C-polymer as solid, and the S-polymer as liquid, are separated by solid-liquid separation.

Now, the present invention will be described with reference to Examples (Examples 1 and 2).

EXAMPLE 1

As an ion exchange membrane, an ion exchange membrane comprising a membrane of the C-polymer, a membrane of the S-polymer and a woven fabric of PTFE, laminated one on another and having inorganic particles (particles of silicon carbide, particles of zirconium oxide and particles of surface precipitates) deposited on the surface, which was used for electrolysis of sodium chloride, was prepared. In this ion exchange membrane, the C-polymer was a sodium salt of a copolymer of tetrafluoroethylene with perfluorovinyl ether having a carboxylic acid group and had an ion exchange capacity of 1.8 meq/g dry resin. The S-polymer was a sodium salt of a copolymer of tetrafluoroethylene with perfluorovinyl ether having a sulfonic acid group and had an ion exchange capacity of 1.1 meq/g dry resin.

Into a 500 ml flask equipped with a condenser and a stirrer, 180 g of water and 20 g of ethanol were introduced, and 10 g of the above ion exchange membrane cut into 2 square cm was added. After stirring at 20° C. for 15 hours to let the ion exchange membrane swell, filtration was carried out with a 10 mesh sieve. The swelling ratio at that time was 1.5. Then, the obtained solid filtration product and 200 g of water were put into a 500 ml flask and stirred at 20°

C. for 30 minutes, followed by filtration with a 10 mesh sieve. This operation of mixing and stirring the filtration product and water, followed by filtration, was repeated three times to remove inorganic particles.

The filtration product having inorganic particles removed and 200 g of methanol were put into a 500 ml flask and refluxed at 60° C. for 15 hours, followed by filtration with a 10 mesh sieve. The woven fabric of PTFE was withdrawn as the filtration product, and the methanol solution having the C-polymer and the S-polymer dissolved therein was withdrawn as the filtrate. Then, the obtained filtrate was subjected to centrifugal separation at 4,000 rpm for 30 minutes, whereupon the supernatant was subjected to filtration with a filter paper having openings of 0.3 μm and the remaining inorganic particles were removed.

The obtained methanol solution having the C-polymer and the S-polymer dissolved therein and 0.4 g of a 10 mass% hydrochloric acid aqueous solution were put into a flask and refluxed at 60° C. for 6 hours, followed by filtration with a filter paper having openings of 0.3 μm over a period of 0.5 hour, to obtain a methyl ester of the C-polymer as a filtration product in a yield of 83.4%. Further, the solvent of the filtrate was distilled off to obtain the S-polymer in a yield of 67.3%.

With respect to each of the methyl ester of the C-polymer and the S-polymer, the contents of silicon carbide, zirconium oxide and the surface precipitates (calculated as an iron element) were measured by ICP (high frequency inductively coupled plasma emission spectrometry) and found to be at most 10 ppm in all cases. Further, the purity of polymers was measured by $^{19}$F-NMR (superconductive nuclear magnetic resonance spectrometry), whereby the purity of the methyl ester of the C-polymer was 95%, and the purity of the S-polymer was 95%.

Further, the C-polymer was further purified as follows. Into a 50 ml flask equipped with a condenser and a stirrer, 0.4 g of the obtained methyl ester of the C-polymer, 19.6 g of methanol and 0.02 g of concentrated sulfuric acid were charged and refluxed with stirring at about 58° C. for 6 hours. After cooling, filtration was carried out with a membrane filter having openings of 3 μm, to obtain a solid methyl ester of the C-polymer as the filtration product. This product was analyzed by $^{19}$F-NMR, whereby the purity was 99%.

Further, the S-polymer was further purified as follows. Into a 50 ml flask equipped with a condenser and a stirrer, 0.4 g of the S-polymer obtained in Example 1, 19.6 g of methanol and 0.02 g of concentrated sulfuric acid were charged and refluxed with stirring at about 58° C. for 6 hours. After cooling, filtration was carried out with a membrane filter having openings of 3 μm, to obtain a methanol solution of the S-polymer as the filtration. The product was analyzed by $^{19}$F-NMR, whereby the purity was 99%.

EXAMPLE 2

Into a 500 ml flask, 10 g of the same ion exchange membrane cut into 2 square cm as used in Example 1, and 200 g of methanol were charged and stirred at 60° C. for 15 hours, followed by filtration with a 10 mesh sieve. The woven fabric made of PTFE was withdrawn as the filtration product, and the methanol solution having the C-polymer and the S-polymer dissolved therein, was withdrawn as the filtrate. Then, this filtrate was subjected to centrifugal separation at 4,000 rpm for 30 minutes, whereupon the supernatant was subjected to filtration with a filter paper having openings of 0.1 μm over a period of 20 hours, and the remaining inorganic particles were removed.

In the same manner as in Example 1, from the methanol solution having the C-polymer and the S-polymer dissolved therein, the methyl ester of the C-polymer was obtained in a yield of 80.7% and the S-polymer was obtained in the yield of 60.7%.

With respect to each of the methyl ester of the C-polymer and the S-polymer, the contents of silicon carbide, zirconium oxide and surface precipitates (calculated as an iron element) were measured by ICP and found to be at most 10 ppm in all cases. Further, the purity of polymers was measured by $^{19}$F-NMR, whereby the purity of methyl ester of the C-polymer was 90%, and the purity of the S-polymer was 95%.

By the present invention, fluoropolymers in a used fluorine-containing ion exchange membrane can be recovered efficiently and simply. A recycling process can be established for the fluoropolymers, whereby it is possible to reduce wastes.

The entire disclosure of Japanese Patent Application No. 2001-67300 filed on Mar. 9, 2001 including specification, claims and summary are incorporated herein by reference in its entirety.

What is claimed is:

1. A process for recovering fluoropolymers, comprising:
    contacting an ion exchange membrane comprising
        a) a C-polymer which is a fluoropolymer having a carboxylic acid group,
        b) a S-polymer which is a fluoropolymer having a sulfonic acid group, and
        c) inorganic particles deposited on a surface of said ion exchange membrane, with a solvent which dissolves the C-polymer and the S-polymer;
    separating 1) a solution having the C-polymer and the S-polymer dissolved therein and 2) the inorganic particles;
    esterifying the C-polymer in the solution to obtain a precipitate of an ester of the C-polymer; and
    fractionating and recovering said precipitate and a solution having the S-polymer dissolved therein by solid-liquid separation.

2. The process for recovering fluoropolymers according to claim 1, wherein the solvent which dissolves the C-polymer and the S-polymer is an alkyl alcohol or a mixed solution of an alkyl alcohol and water; and
    wherein said alkyl alcohol is used for said esterifying of the C-polymer.

3. The process for recovering fluoropolymers according to claim 1, further comprising
    treating the C-polymer and the S-polymer with an acid to convert a salt form of said C-polymer to an acid form of said C-polymer and to convert a salt form of said S-polymer to an acid form of said S-polymer;
    wherein said treating occurs before or at the time of contacting the ion exchange membrane with the solvent which dissolves the C-polymer and the S-polymer.

4. The process for recovering fluoropolymers according to claim 1, wherein the C-polymer is a copolymer obtained by polymerizing tetrafluoroethylene with a perfluoro vinyl ether having a carboxylic acid group; and
    wherein the C-polymer has an ion exchange capacity of from 0.8 to 1.9 meq/g dry resin.

5. The process for recovering fluoropolymers according to claim 1, wherein the S-polymer is a copolymer obtained by polymerizing tetrafluoroethylene with a perfluoro vinyl ether having a sulfonic acid group; and wherein the S-polymer has an ion exchange capacity of from 0.8 to 1.3 meq/g dry resin.

6. The process for recovering fluoropolymers according to claim 1, wherein the solvent which dissolves the C-polymer and the S-polymer is methanol or an aqueous methanol solution having a content of water of not more than 30 mass %.

7. The process for recovering fluoropolymers according to claim 1, wherein the C-polymer is obtained by hydrolyzing a copolymer of tetrafluoroethylene and $CF_2=CFOCF_2CF(CF_3)OCF_2CF_2CO_2CH_3$.

8. The process for recovering fluoropolymers according to claim 1, wherein the S-polymer is obtained by hydrolyzing a copolymer of tetrafluoroethylene and $CF_2=CFOCF_2CF(CF_3)OCF_2CF_2SO_2F$.

9. A process for recovering fluoropolymers, comprising:

treating an ion exchange membrane comprising
   a) a C-polymer which is a fluoropolymer having a carboxylic acid group;
   b) a S-polymer which is a fluoropolymer having a sulfonic acid group; and
   c) inorganic particles deposited on a surface of said ion exchange membrane;
with a first solvent to obtain a swollen ion exchange membrane;

removing said inorganic particles from said swollen ion exchange membrane;

contacting said swollen ion exchange membrane with a second solvent which dissolves the C-polymer and the S-polymer to obtain a solution having the C-polymer and the S-polymer dissolved therein;

esterifying the C-polymer in the solution to obtain a precipitate of an ester of the C-polymer; and fractionating and recovering the precipitate and a solution having the S-polymer dissolved therein by solid-liquid separation.

10. The process for recovering fluoropolymers according to claim 9, wherein the solvent which dissolves the C-polymer and the S-polymer is an alkyl alcohol or a mixed solution of an alkyl alcohol and water; and wherein said alkyl alcohol is used for the esterification of the C-polymer.

11. The process for recovering fluoropolymers according to claim 9, further comprising treating the C-polymer and the S-polymer with an acid to convert a salt form of said C-polymer to an acid form of said C-polymer and to convert a salt form of said S-polymer to an acid form of said S-polymer;

wherein said treating occurs before or at the time of contacting the ion exchange membrane with the solvent which dissolves the C-polymer and the S-polymer.

12. The process for recovering fluoropolymers according to claim 9, wherein the C-polymer is a copolymer obtained by polymerizing tetrafluoroethylene with a perfluoro vinyl ether having a carboxylic acid group; and wherein said C-polymer has an ion exchange capacity of from 0.8 to 1.9 meq/g dry resin.

13. The process for recovering fluoropolymers according to claim 9, wherein the S-polymer is a copolymer obtained by polymerizing tetrafluoroethylene with a perfluoro vinyl ether having a sulfonic acid group; and wherein said S-polymer has an ion exchange capacity of from 0.8 to 1.3 meq/g dry resin.

14. The process for recovering fluoropolymers according to claim 9, wherein the solvent which dissolves the C-polymer and the S-polymer is methanol or an aqueous methanol solution having a content of water of not more than 30 mass %.

15. The process for recovering fluoropolymers according to claim 9, wherein the C-polymer is obtained by hydrolyzing a copolymer of tetrafluoroethylene with $CF_2=CFOCF_2CF(CF_3)OCF_2CF_2CO_2CH_3$.

16. The process for recovering fluoropolymers according to claim 9, wherein the S-polymer is obtained by hydrolyzing a copolymer of tetrafluoroethylene and $CF_2=CFOCF_2CF(CF_3)OCF_2CF_2SO_2F$.

17. The process for recovering fluoropolymers according to claim 9, wherein said first solvent is a mixed solvent comprising a water-soluble organic solvent and water.

18. The process for recovering fluoropolymers according to claim 17, wherein the water-soluble solvent is methanol or ethanol.

19. The process for recovering fluoropolymers according to claim 9, wherein a swelling ratio of a mass of the ion exchange membrane after swelling to the mass of the ion exchange membrane before swelling is at least 1.2.

* * * * *